United States Patent [19]

Taniguchi et al.

[11] Patent Number: 4,774,687
[45] Date of Patent: Sep. 27, 1988

[54] ADVANCED STORE-IN SYSTEM FOR A HIERARCHY MEMORY DEVICE

[75] Inventors: Toshihisa Taniguchi; Tsutomu Sumimoto, both of Hadano; Takashi Kumagai, Isehara, all of Japan

[73] Assignee: Hitachi, Ltd., Tokyo, Japan

[21] Appl. No.: 748,945

[22] Filed: Jun. 26, 1985

[51] Int. Cl.[4] .............................................. G06F 13/00
[52] U.S. Cl. .......................................................... 364/900
[58] Field of Search ... 364/200 MS File, 900 MS File

[56] References Cited

U.S. PATENT DOCUMENTS

| | | | |
|---|---|---|---|
| 3,735,360 | 5/1973 | Anderson et al. | 364/200 |
| 3,829,840 | 8/1974 | Burk et al. | 364/200 |
| 3,936,234 | 12/1975 | Queisser | 364/900 |
| 4,149,245 | 4/1979 | Gannon et al. | 364/200 |
| 4,181,937 | 1/1980 | Hattori et al. | 364/200 |
| 4,313,158 | 1/1982 | Porter | 364/200 |
| 4,395,763 | 7/1983 | Takahashi | 364/900 |
| 4,425,615 | 1/1984 | Swenson | 364/200 |
| 4,453,216 | 6/1984 | Chiba et al. | 364/200 |
| 4,471,427 | 9/1984 | Harris | 364/200 |
| 4,658,349 | 4/1987 | Tabata | 364/200 |

Primary Examiner—Raulfe B. Zache
Assistant Examiner—A. Mohamed
Attorney, Agent, or Firm—Antonelli, Terry & Wands

[57] ABSTRACT

A memory access control system for an information processing apparatus having a buffer memory and a main memory wherein when a store or access request is generated, in the case where the data block in the address to be accessed does not exist in the buffer memory, the store requested data from a data register is written into the buffer memory before the first data in the data block read out from the main memory is written into the buffer memory, and the data register is released to receive the next request.

14 Claims, 6 Drawing Sheets

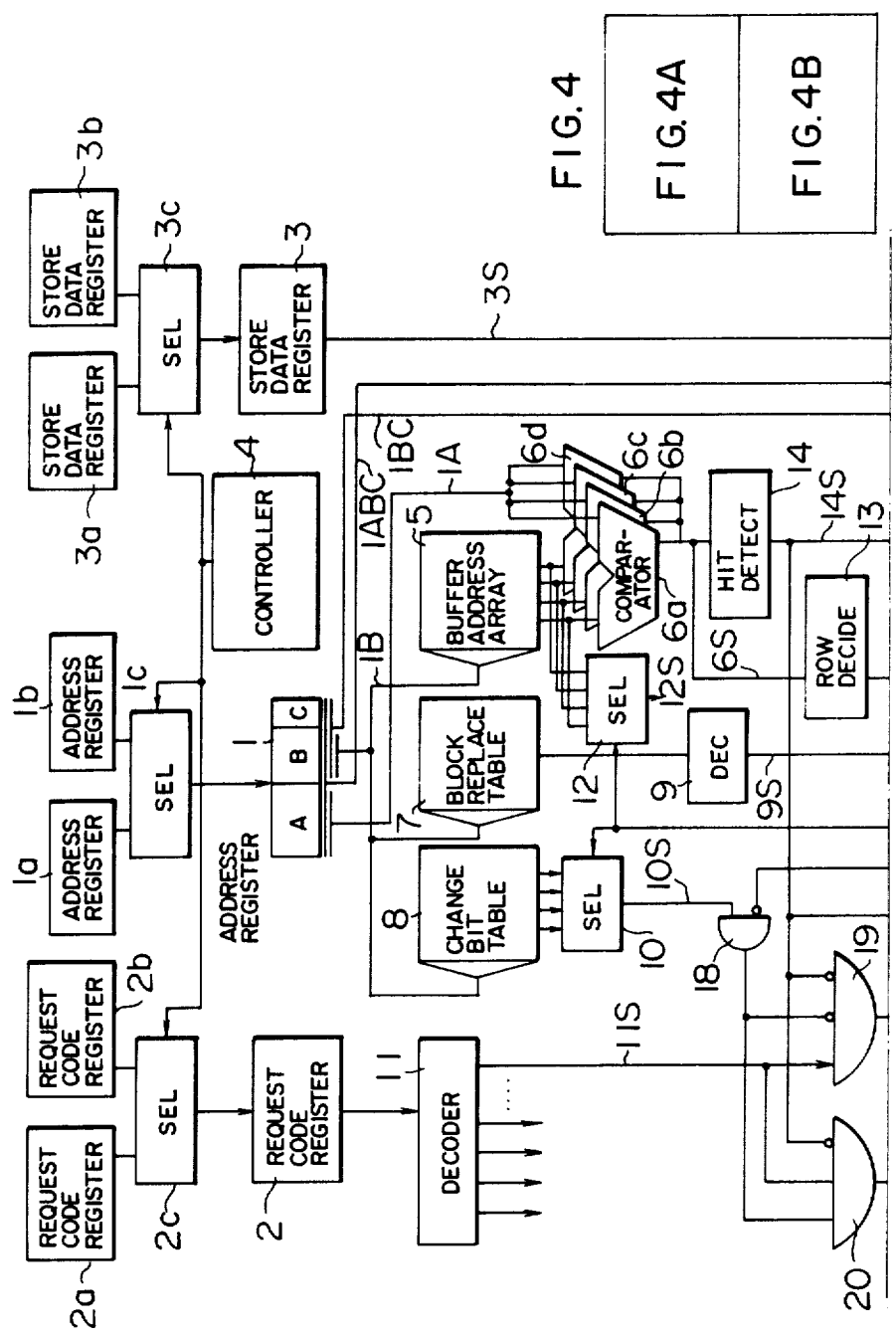

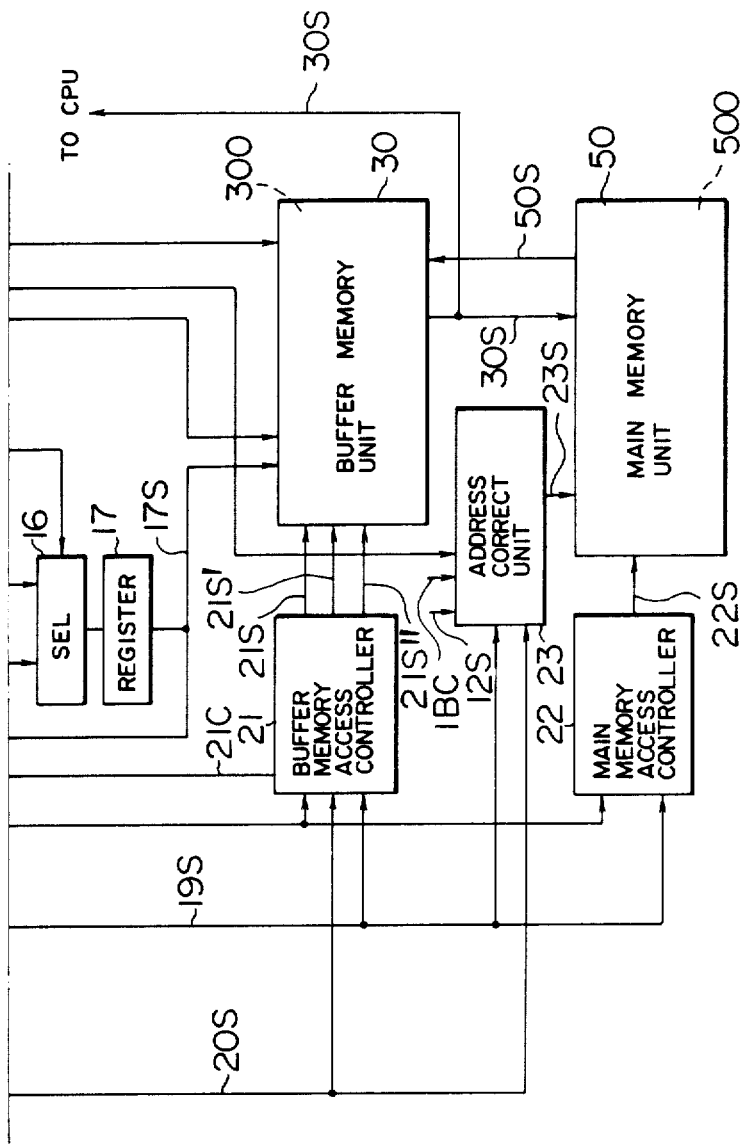
F I G. 4B

ADVANCED STORE-IN SYSTEM FOR A HIERARCHY MEMORY DEVICE

BACKGROUND OF THE INVENTION

The present invention relates to a memory access control system and, more particularly, to a memory access control system which is suitable for an information processing apparatus having a main memory and a buffer memory.

In information processing apparatuses in which a high speed data processing performance is required, a buffer memory which can read/write data at a higher speed than a main memory is provided in the apparatus, and duplicates of partial data blocks which are frequently used among the data blocks stored in the main memory are provided in the buffer memory, thereby making it possible to promptly respond to an access request from a CPU. As an information processig apparatus having a buffer memory, such an apparatus is disclosed in the specification of, for example, U.S. Pat. No. 3,735,360, "High Speed Buffer Operation In a Multi-Processing System", or U.S. Pat. No. 3,829,840, "Virtual Memory System".

In such an information processing apparatus of the buffer storing system, it is necessary to allow the updating of the data performed in the buffer memory to be reflected into the main memory. Hitherto, in the access system called "store-through", whenever the store access is generated in the data blocks in the buffer memory, data is also stored into the corresponding data blocks in the main memory. According to this system, the advantage of the buffer memory is lost since the number of access times to the main memory increases.

Further, there is known a system, as a "store-in" system, whereby in the case where the necessary data block to be accessed exists in the buffer memory when the data store/access request is generated, the data is stored only into the buffer memory and the content of the main memory is not updated at this time. In the store-in system, a change bit table to store the bit indicating whether data was updated or not is provided in correspondence with each data block in the buffer memory. When it is necessary to swap in the new data block (II) from the main memory in place of one data block (I) in the buffer memory, if a change indication bit is set relative to the data block (I) in the foregoing table, the swap-in operation of the data block (II) is performed after the data block (I) is swapped out to the main memory. If the change indication bit is not set, the swap-out of the data block (I) is omitted and the data block (II) is transferred into the buffer memory. According to this store-in system, the memory access request from the CPU can be satisfied by merely accessing the buffer memory without accessing the main memory until the data blocks in the buffer memory are swapped out to the main memory, so that the data can be processed at a high speed.

However, in the foregoing conventional information processing apparatus of the buffer storing system, in the case where the data in the address to be stored or accessed does not exist in the buffer memory, the whole single data block including this data is transferred from the main memory to the buffer memory and thereafter it is stored into a predetermined address in the buffer memory. Therefore, in the processing apparatus in which, for instance, one data block consists of 64 bytes and which transfers data $D_0$ to $D_7$ from the main memory into the buffer memory on an 8-byte unit basis at every machine cycle, there is the following problem. That is, in the case where a full-store request is generated with respect to the data $D_0$ and $D_1$ of 16 bytes, conventionally, as shown in FIG. 1, the data registers cannot be released and the next request cannot be received until the writing operations of the data $D_0$ and $D_1$ from the store requested data registers are finished after completion of the writing of the last data $D_7$ read out from the main memory into the buffer memory.

SUMMARY OF THE INVENTION

It is an object of the present invention to provide a memory access control system in an information processing apparatus having a buffer memory in which it is possible to reduce the time required for data storing process when the data in the address to be stored or accessed does not exist in the buffer memory.

Another object of the invention is to provide a memory access control system in an information processing apparatus having a buffer memory in which it is possible to reduce the time required for transfer of data blocks from the main memory into the buffer memory that is caused upon storage or access.

Still another object of the invention is to provide a high speed memory access control method for an information processing apparatus having a buffer memory.

To accomplish the above objects, a memory access control system for an information processing apparatus according to the present invention comprises:

a first memory divided into a plurality of blocks;

a second memory for storing a duplicate of partial data stored in the first memory on a block unit basis, this second memory being able to be accessed at a higher speed than the first memory and having a memory capacity smaller than that of the first memory;

a data register for temporarily holding the store requested data;

an address register for temporarily holding the address of the store requested data;

a discriminator for outputting a discrimination signal indicative of the presence or absence in the second memory regarding the duplicator of the data block including the data designated by the address in the address register;

a first memory access controller for controlling the reading operation of data from the first memory and the writing operation of data into the first memory;

a second memory access controller for controlling the reading operation of data from the second memory and the writing operation of data into the second memory; and a third controller for supplying control signals to the first and second memory access control means in response to the discrimination signal from the discriminator when a data store request is generated in a manner such that the data in the data register is written into the second memory in the case where the duplicate of the data block corresponding to this request exists in the second memory and that the duplicate of the remaining data in the relevant data block read out from the first memory is written into the second memory after the data in the foregoing data register was written into the second memory in the case where the duplicate of the above-mentioned data block does not exist in the second memory.

For instance, in the information processing apparatus using a memory constitution of two hierarchies of a main memory and a buffer memory, the first memory corresponds to the main memory and the second memory corresponds to the buffer memory. However, in the information processing system using a multi-hierarchy memory system further having an intermediate buffer memory between the main memory and the buffer memory, the intermediate buffer memory can be the first or second memory.

In the embodiment of the invention, the second memory has a data memory area as well as a plurality of blocks;

the discriminating means has fourth means for generating position information to designate the area in the second memory in order to store the duplicate of the data block read out from the first memory in the case where the duplicate of the data block including the data designated by the address in the address register does not exist in the second memory;

and the second memory writes the data from the data register and the remaining data in one block from the first memory within the range of the memory area specified by the position information from the address, as a start point, that is determined by a part of the content of the address register.

Also, according to the present invention, a memory access method is provided for an information processing apparatus comprising a first memory divided into a plurality of blocks and a second memory for storing the duplicate of partial data stored in the first memory on a block unit basis, this second memory being able to be accessed at a higher speed than the first memory, which comprises:

the first step of discriminating the presence or absence in the second memory with regard to the duplicate of the data block corresponding to the store address when a data store request is generated;

the second step of designating the area in the second memory for storage of the duplicate of the abovementioned data block in the case where it is determined that the duplicate of the data block corresponding to the store address does not exist in the second memory in the first step;

the third step of writing the store requested data into the designated area in the second memory prior to transferring the data block from the first memory into the second memory; and the fourth step of writing the remaining data in one data block read out from the first memory excluding the store requested data into the designated area in the second memory.

It is preferable to read out only the remaining data in one data block from the first memory in order to sequentially write from the data in the next address of the store requested data into the second memory.

Other features and advantages of the invention will be apparent from the following description taken in connection with the accompanying drawings.

BRIEF DESCRIPTION OF THE DRAWINGS

FIGS. 4, 4A and 4B are a block diagram showing one embodiment of the memory access control system according to the invention;

DESCRIPTION OF THE PREFERRED EMBODIMENT

Figure 2:
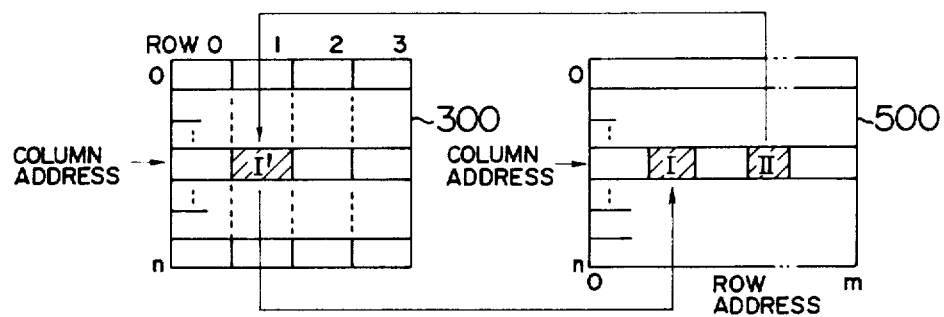
FIG. 2 is a diagram to explain the relation between a main memory and a buffer memory.

The relation between a buffer memory 300 and a main memory 500 will be first described with reference to FIG. 2. The main memory 500 is divided in such a manner that one data block has a size of, e.g., 64 bytes and each data block is designated by column addresses of 0 to n and row addresses of 0 to m. On the other hand, the buffer memory 300 has column addresses of 0 to n corresponding to the main memory and each column has row addresses of 0 to 3. Therefore, in this example, the duplicate of up to four data blocks among (m+1) data blocks in the main memory can be stored into the buffer memory for every column address. In the case where it is necessary to transfer further one data block (II) into the buffer memory from the same column in the main memory 500 in the state whereby one column in the buffer memory 300 has already stored four data blocks, for example, one data block (I') selected by way of an LRU (Least Recently Used) system is turned out from the buffer memory and in place of this data block, the data block (II) is stored into the buffer memory. At this time, if the content of the data block (I') to be turned out is different from the content of the corresponding data block (I) in the main memory, the data block (I') is swapped out to the main memory 500.

Figure 1:
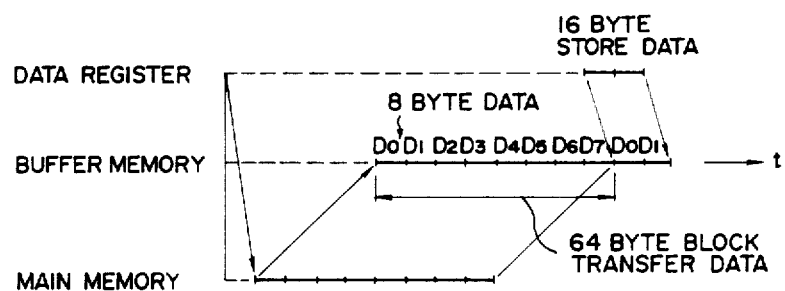
FIG. 1 is a time chart for the data storing operation in a conventional memory access control system.
Figure 3:
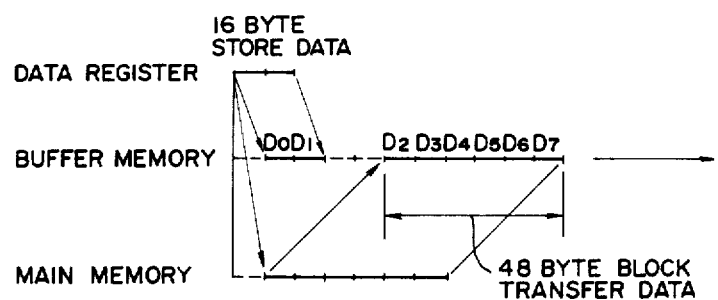
FIG. 3 is a time chart showing one example in the data storing operation in a memory access control system according to the present invention.

In comparison with the conventional system described in FIG. 1, the memory access control according to the present invention will be characterized by a time chart shown in FIG. 3. Namely, in the case where a store/access request is generated from a CPU with respect to, e.g., two data $D_0$ and $D_1$ each having 8-byte unit which are included in the data block that does not exist in the buffer memory 300, according to the invention, the writing operations of the data $D_0$ and $D_1$ in the data register into the buffer memory are started before the relevant data blocks are written into the buffer memory 300 from the main memory 500. Only the remaining data $D_2$ to $D_7$ excluding the data $D_0$ and $D_1$ are transferred from the main memory 500 into the buffer memory 300. A command for the above-mentioned data transfer may be issued to an access controller of the main memory simultaneously with the data writing from the data register into the buffer memory. Since the access time to the buffer memory is fairly faster than that to the main memory, the data $D_0$ and $D_1$ in the data register can be completely written before the first data $D_2$ read out from the main memory reaches the buffer memory and the data register can be released immediately after completion of this writing. In addition, according to the invention, a small amount of data excluding the data portion, for which a store request has been made by the CPU, in the data of one block may be transferred into the buffer memory from the main memory, so that the transfer of the data block into the buffer memory can be completed faster than the conventional system.

FIGS. 4A and 4B are a block diagram showing one embodiment of a memory access control system of the present invention to perform the foregoing memory access. In the diagram, a reference numeral 30 denotes a buffer memory unit including a buffer memory 300 and an address circuit, and 50 is a main memory unit including the main memory 500 and an address circuit. In this example, two registers, for example, CPUs can commonly use the memory system. A memory address, a request code and a store data which are supplied from the first CPU are set into registers 1a, 2a and 3a, respectively. Also, a memory address, a request code and a store data which are supplied from the second CPU are set into registers 1b, 2b and 3b, respectively. The contents of the registers 1a to 3a or 1b to 3b selected by selectors 1c, 2c and 3c are set into an address register 1, a request code register 2 and a store data register 3, respectively. The address register 1 consists of three fields of the first field A, second field B and third field C. The second field B indicates the column address and the third field C represents the address in the column. Numeral 4 denotes a request reception controller to control the selectors 1c, 2c and 3c.

Numeral 5 denotes a buffer address array to store the high-order bit portion of the address in the main memory 500 of each data block stored in the buffer memory 300 corresponding to the first field A. This buffer address array consists of the columns of 0 to n each having the row addresses of 0 to 3 similarly to the buffer memory 300. Numeral 7 represents a block replace table to designate the row address in the data block, for every column, that should be turned out from th buffer memory in order to add the new data block into the buffer memory. Numeral 8 denotes a table to store a change indication bit to indicate whether the content was changed or not for every data block in the buffer memory.

When the memory address, request code and store data are set into the registers 1, 2 and 3, respectively, a check is made to see if the data in the address set by the address register 1 exists in the buffer memory 300 or not by way of the retrieval of the buffer address array 5. This retrieval operation is performed in such a manner that the contents of four rows of the buffer address array 5 are read out using the value in the second field B in the address register as a column address and the value of the memory address read out from each row and the value in the first field A in the address register 1 are compared by means of comparators 6a, 6b, 6c, and 6d. The comparators 6a to 6d respectively correspond to the row addresses 0 to 3. The row address is determined by a row number deciding circuit 13 on the basis of an output of each comparator. A numeral 14 is a hit detecting circuit which sets an output 14S to "1". when either one of those comparators generates a coincidence output. A selector 16 is controlled by the output 14S of the hit detecting circuit 14. When the output 14S is "1", an output of the row number deciding circuit 13 is set into a register 17 through the selector 16. When the output 14S of the hit detecting circuit is "0", the selector 16 allows an output 9S of a decoder 9 for decoding an output of the block replace table 7 to be supplied to a register 17. Consequently, when the data block requested by the CPU exists in the buffer memory, the row address in the relevant data block is set into the register 17, while in the opposite case, the row address in the data block that should be turned out from the buffer memory is set into the register 17. An output 17S of the register 17 is supplied to the buffer memory unit together with an output 1BC of the second and third fields B and C in the address register 1.

The output 14S of the hit detecting circuit 14 is also inputted to 3-input AND gates 19 and 20, a buffer memory access controller 21, and a main memory access controller 22. An output signal 11S from a decoder 11 for decoding the request code and a change indication bit 10S from the table 8 selected by a selector 10 are also inputted to the AND gates 19 and 20. An output 19S of the AND gate 19 is supplied to the buffer memory access controller 21, main memory access controller 22 and a main memory address correcting unit 23 which will be described later. An output 20S of the AND gate 20 is supplied to the controller 21 and the unit 23.

The output 19S of the AND gate 19 becomes "1" when both of the output 14S of the hit detecting circuit 14 and the change indication bit 10S are "0" and the output signal 11S of the decoder is "1". The signal 11S becomes "1" when a store request is generated from the CPU such as, for instance, in the foregoing all-store request of 16 bytes. Therefore, in this embodiment, when the new data block is transferred from the main memory into the buffer memory without performing the swap-out operation, the output 19S of the AND gate 19 serves as an activating signal to instruct the start of the storing operation for the buffer memory access controller 21 and the start of the data transfer for the main memory access controller 22.

The output signal 20S of the AND gate 20 serves as a control signal to permit the data block in the buffer memory to be swapped out into the main memory. The output signal 20S becomes "1" when a hit detection signal 14S is "0" and the change indication bit 10S is "1". When the controller 21 receives the signal 20S of "1", it allows one data block which is designated by the signal lines 17S and 1BC to be swapped out into the main memory from the buffer memory 300 and then sets a signal 21C to "1" after completion of this swap-out. An AND gate 18 inserted in the output circuit of the change indication bit 10S is controlled by the signal 21C. When the signal 21C is set to "1", an output of the AND gate 18 is set to "0". Thus, the output 19S of the AND gate 19 becomes "1" in place of the output 20S of the AND gate 20, thereby starting the data storing operation into the buffer memory due to the buffer memory access controller 21 and the data block transfer operation by way of the main memory access controller 22.

Figure 5:
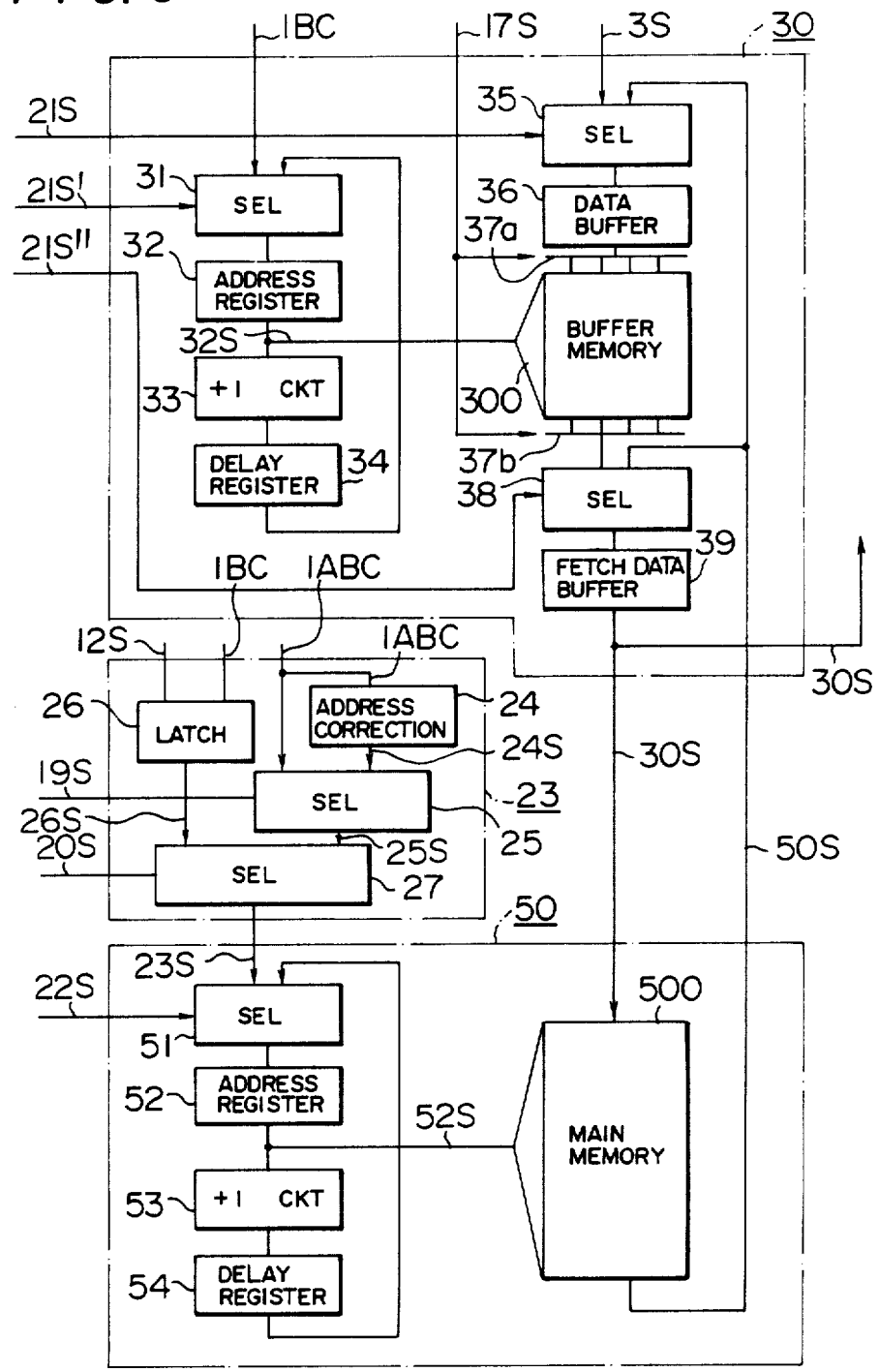
FIG. 5 is a block diagram showing the details of a buffer memory unit 30, a main memory unit 50 and an address correcting unit 23 in the embodiment.

FIG. 5 shows the details of the buffer memory unit 30, main memory unit 50 and address correcting unit 23.

In the buffer mexory unit 30, the content 1BC of the second and third fields B and C in the address register 1 is taken into an address register 32 through a selector 31 in the first memory cycle. An output 32S of the address register 32 addresses the buffer memory 300. In addition, after the address 32S was updated by an incremental circuit 33 having a wrap-around function, this address output 32S is held in a delay register 34. The selector 31 is controlled by a control signal 21S' which is outputted from the controller 21. In the second memory cycle and subsequent memory cycles, an output of the delay register 34 is taken into the address register 32. On the other hand, a store data 3S of an 8-byte unit which is outputted from the data register 3 is taken into a data buffer 36 through a selector 35 and is stored at the position of the address 32S in the memory area that belongs to a predetermined row in the buffer memory 300 through a selector 37a selected by the row address 17S.

An output addrsss 1ABC of the first to third fields in the address register 1, the output address 1BC of the second and third fields, and a data block address 12S which is read out from the buffer address array 5 selected through a selector 12 are inputted to the main memory address correcting unit 23. The unit 23 includes: an address correction circuit 24 which causes the address 1ABC to be skipped by the value corresponding to the length of data for which a store request has been made; a latch circuit 26 to produce an address 26S on the distant side for the swap-out by combining the addresses 1BC and 12S; a selector 25 to select either one of the address 1ABC and a correction address 24S in response to a control signal 19S; and a selector 27 to select either one of the address 26S and an output address 25S of the selector 25 in response to the control signal 20S.

The main memory unit 50 comprises: a selector 51 to select either one of an address 23S outputted from the main memory address correcting unit 23 and an address outputted from a delay register 54; an address register 52 to hold an output of the selector 51; and an incremental circuit 53 having a wrap-around function to update an output of the address register 52. The selector 51 is controlled by a control signal 22S which is outputted from the controller 22. This selector selects the address 23S in the first memory cycle and selects the incremented address that is outputted from the delay register 54 in the next and subsequent memory cycles and then sets into the address register 52.

Figure 6:
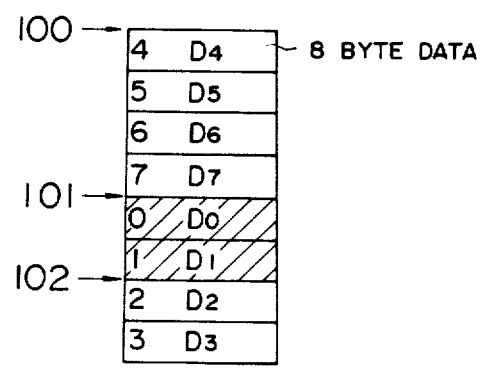
FIG. 6 is a diagram to explain the data storing operation into the buffer memory.

An explanation will be made as an example with respect to the 16-byte full-store request described in FIG. 3. The address 1ABC which is outputted from the address register 1 indicates the boundary of data of an 8-byte unit in the 64-byte data block shown in FIG. 6. In the case where the first data $D_0$ which is written by way of the buffer memory access controller 21 starts from the address indicated at a numeral 101, the data may be read out from the main memory 500 sequentially from the data $D_2$ in the address indicated at a numeral 102. The main memory address correction circuit 24 serves to produce the main memory readout start address corresponding to a numeral 102 on the basis of the address 1ABC responsive to the numeral 101. After the data $D_3$ in FIG. 6 was stored into the buffer memory 300, it is necessary to return the memory address 32A to a boundary address 100 in the relevant 64-byte data block. Similarly, in the main memory unit 50 as well, after completion of the readout of the data $D_3$, it is necessary to return a next address 52S to the boundary address 100. The incremental circuits 33 and 53 and the correction circuit 24 perform the foregoing address updating due to the wrap-around function.

Returning to FIG. 5, the data ($D_2$ to $D_7$) read out from the main memory 500 are sequentially supplied through a line 50S to the buffer memory unit 30 and are inputted through the selector 35 to the data buffer 36. In addition, when a read request is generated, the data read out from the buffer memory 300 or main memory 500 is sent to the CPU side through a selector 38, a fetch data buffer 39 and a line 30S which are provided in the buffer memory unit.

In case of swapping out the data block read out from the buffer memory 300 into the main memory 500, the output 20S of the AND gate 20 becomes "1". In this case, the selector 27 in the unit 23 selects the output 26S of the latch circuit 26 and outputs as the main memory address 23S. The latch output 26S is the address value consisting of the value 12S indicative of the address in the main memory of the data block to be swapped out which was read out from the buffer address array 5 and the value 1BC of the fields B and C in the memory address which is outputted from the address register 1. The latch output 26S indicates the address in the main memory of the data that is first read out from the buffer memory 300 to swap-out. Therefore, in the main memory unit 50, the data which is read out from the buffer memory 300 and is sequentially supplied through the line 30S is written into the foregoing address position and the subsequent address positions, thereby enabling the data to be updated in the main memory 500. On one hand, for the swap-out operation of the data block from the buffer memory into the main memory, a high speed buffer register having a capacity as much as one data block is provided between the buffer memory 300 and the main memory 500, and the data block fetched from the buffer memory 300 into this buffer register may be transferred into the main memory 500 using the idle time after that.

In the embodiment described above, an example of application of the invention to the memory system of two hierarchies consisting of the main memory 500 and buffer memory 300 has been explained. However, in a multi-hierarchy memory system having one or more stages of intermediate buffer memories between the main memory and the buffer memory over two hierarchies as well, the memory access control of the invention can be properly applied to the data transfer between the main memory and a first intermediate buffer, between the first intermediate buffer and a second intermediate buffer, and between the second intermediate buffer and the most significant buffer memory. In this case, the memory on the lower significant side may be allowed to correspond to the main memory in the embodiment, while the memory on the higher significant side may be allowed to correspond to the buffer memory in the embodiment.

In addition, in the foregoing embodiment, there has been shown the constitution whereby only the necessary data other than the store data that is written into the buffer memory 300 from the data register 3 is read out from the main memory 500 and is transferred into the buffer memory 300 using the main memory address correcting unit 23. However, as a modified form, it is also possible to adopt the constitution such that when all of the subblock data are read out from the main memory and are written into the buffer memory, the writing of the data that has already been stored is inhibited. In this case as well, since the data storing operation from the data register into the buffer memory is performed in parallel with the data reading instruction to the main memory, a merit such that the data register is rapidly released is utilized, so that the next store request can be received early.

Further, the data transfer operation when all-data store request of 16 bytes is generated has been shown in the foregoing embodiment, but the present invention can also be applied to any data store request other than this all-store request.

We claim:

1. A memory access control system for an information processing apparatus comprising:

a first memory divided into a plurality of block areas each storing a data block which includes a plurality of data bytes;

a second memory for storing a duplicate of a predetermined number of data blocks stored in said first memory, said second memory being accessable at a higher speed than said first memory and having a memory capacity smaller than that of said first memory;

a data register for temporarily holding store-requested data, said store-requested data including a number of data bytes which is smaller than said plurality of data bytes in each data block;

an address register for temporarily holding an address of said store-requested data;

discriminating means for generating a discrimination signal indicative of presence or absence in said second memory of a data block which includes the store-requested data designated by said address in said address register;

first memory access control means for controlling a reading operation of data from said first memory and a writing operation of data into said first memory;

second memory access control means for controlling a reading operation of data from said second memory and a writing operation of data into said second memory; and third control means for supplying control signals to said first and second memory access control means in response to said discrimination signal from said discriminating means when a data store request is generated, such that said store-requested data held in said data register is written into said second memory when a duplicate of said data block which includes said store-requested data exists in said second memory and such that remaining data, which is equal to said plurality of data bytes corresponding to said data block which includes said store-requested data minus said number of data bytes corresponding to said store-requested data, in said data block read out from said first memory is written into said second memory after said store-requested data has been written into said second memory when a duplicate of said data block which includes said store-requested data does not exist in said second memory.

2. A system according to claim 1, wherein said second memory includes a data memory area as well as said plurality of data blocks;

said discriminating means includes means for generating position information to designate an area in said second memory to store said data block which includes said store-requested data read out form said first memory when the duplicate of said data block which includes said store-requested data does not exist in said second memory; and said second memory writes said store-requested data from said data register and said remaining data in one data block of said first memory within a range of the memory area whose starting point is specified by said position information from an address that is determined by part of said address held in said address register.

3. A system according to claim 2, said system further including means for correcting said address output from said address register in accordance with the length of said store-requested data, wherein said first memory sequentially reads out said remaining data from said data block which includes said store-requested data excluding said store-requested data using said corrected address as a starting point, and said second memory stores said remaining data from said first memory subsequently to the storage of said store-requested data from said data register.

4. A system according to claim 2, wherein said discriminating means includes means in which, for every data block existing in said second memory, indication information representing whether or not it is necessary to write said data block into said first memory is stored and which outputs said indication information corresponding to the data block that is designated by said position information when the duplicate of said data block which includes said store-requested data does not exist in said second memory, and wherein said third control means supplies control signals to said first and second memory access control means in accordance with said indication information when a data store request is generated such that said store-requested data in said data register is written into said second memroy and said remaining data is written from said first memory into said second memory after the data block in said second memory that is designated by said position information has been written into said first memory.

5. A system according to claim 4, further including means for correting said address output from said address register in accordance with the length of said store-requested data, wherein said first memory sequentially reads out said remaining data from said data block which includes said store-requested data starting from said corrected address, and said second memory stores said remaining data from said first memory subsequently to the storage of said store-requested data from said data register.

6. A memory access method for an information processing apparatus having a first memory divided into a plurality of block areas each storing a data block which includes a plurality of data bytes and a second memory for storing a duplicate of a predetermined number of data blocks stored in said first memory, said second memory being accessable at a higher speed than said first memory, comprising:

a first step of discriminating presence or absence in said second memory of a data block corrresponding to a stored address when a data store request is generated;

a second step of designating an area in said second memory for storing said data block when it is determined that a duplicate of said data block corresponding to said stored address does not exist in said second memory;

a third step of writing store-requested data, which corresponds to said data store request, into said designated area in said second memory prior to transferring said data block from said first memory into said second memory; nad a fourth step of writing remaining data, which is equal to said plurality of data bytes in said data block minus said store-requested data, into said designated area in said second memory.

7. A method according to claim 6, wherein only said remaining data is read out from said first memory in order to sequentially write the data in the next address from said store-requested data into said second memory.

8. A memory access control system for an information processing apparatus comprising:
- a first memory divided into a plurality of block areas each storing a data block;
- a second memory for storing a duplicate of a predetermined number of data blocks stored in said first memory, said second memory being accessable at a higher speed than said first memory and having a memory capacity smaller than that of said first memroy;
- a data register having a length which is shorter than that of a block area, for temporarily holding store-requested data;
- an address register for temporarily holding an address of said store-requested data, said address consisting of a first address for designating a block area and a second address for designating a first partial area in said block area;
- discriminating means for discriminating whether or not a duplicate of a data block having an address equal to said first address is stored in said second memory;
- first memory access control means responsive to a negative result from said discriminating means for controlling a reading operation of a data block from a block area in said first memory which is designated by said first address, said negative result corresponding to a condition wherein a duplicate of a data block including said store-requested data does not exist; and
- second memory access control means responsive to said negative result from said discriminating means for controlling a writing operation to said second memory, said second memory access control means including means for sequentially providing said second memory with said second address and a third address which desginates a second partial area in said block area excluding said first partial area designated by said second memory with said store-requested data from said data register and remaining data in said data block from said first memory which corresponds to said third address;
- wherein said remaining data in said data block read out from said first memory is written into said second memory after said store-requested data in said data register has been written into said second memory.

9. A system according to claim 8, wherein
- said second memory includes a data memory area as well as a plurality of block areas;
- said discriminating means includes generating means for generating position information to designate an area in said second memory to store said data block read out from said first memory when the result from said discriminating means is negative; and
- said second memory writes said store-requested data from said data register and said remaining data from said first memory within a range of said data memory area whose starting point is specified by said position information from an address that is determined by part of said address held in said address register.

10. A system according to claim 9, said system further including means for correcting said address output from said address register in accordance with the length of said store-registered data,
wherein said first memory sequentially reads out said remaining data from said datas block which includes said store-requested data excluding said store-requested data using said corrected address as a starting point,
and said second memory stores said remaining data from said first memory subsequently to the storage of said store-requested data from said data register.

11. A system according to claim 9, wherein said discriminating means includes means in which, for every data block existing in said second memory, indication information representing whether or not it is necessary to write said data block into said first memory is stored and which outputs said indication information corresponding to the data block that is designated by said position information when the duplicate of said data block which includes said store-requested data does not exist in said second memory,
and said system further comprises means for writing the data block in the second memory that is designated by said position information into said first memory before said second memory access control means is activated.

12. A system according to claim 11, further including means for correcting said address output from said address register in accordance with the length of said store-requested data,
wherein said first memory sequentially reads out said remaining data from said data block which includes said store-requested data starting from said corrected address,
and said second memory stores said remaining data from said first memory subsequentily to the storage of said store-requested data from said data register.

13. A memory access method for an information processing apparatus having a first memory divided into a plurality of block areas each storing a data block and a seecond memory for storing a duplicate of a predetermined number of data blocks stored in said first memory, said second memory being accessible at a higher speed than said first memory, comprising:
- a first step of generating a store-requested data having a length which is shorter than that of a data block and generating an address including a first address designating a block area and a second address designating a first partial area in said block area;
- a second step of discriminating whether or not a duplicate of a data block whose address is equal to said first address is stored in said second memory;
- a third step of designating an area in said second memory for storing said data block when the result of said data block discriminating step is negative, a negative result corresponding to a condition wherein a duplicate of a data block including said store-requested data does not exist;
- a fourth step of writing said store-requested data into said designated area in said second memory prior to transferring said data block from said first memory into said second memory; and
- a first step of writing remaining data into said designated area, said remaining data being stored in a second partial area of said block area designated by said first address, said second partial area excluding said first partial area designated by said second address.

14. A method according to claim 13, wherein only said remaining data is read out from said first memory in order to sequentially write the data in the next address from said store-requested data into said second memory.

* * * * *